Aug. 1, 1961 W. J. ZIEGLER 2,994,365
AUTOMOBILE FOOTREST
Filed July 23, 1959
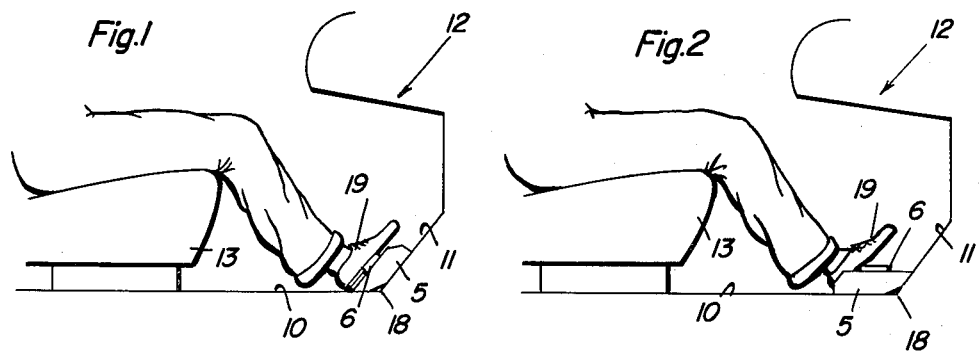
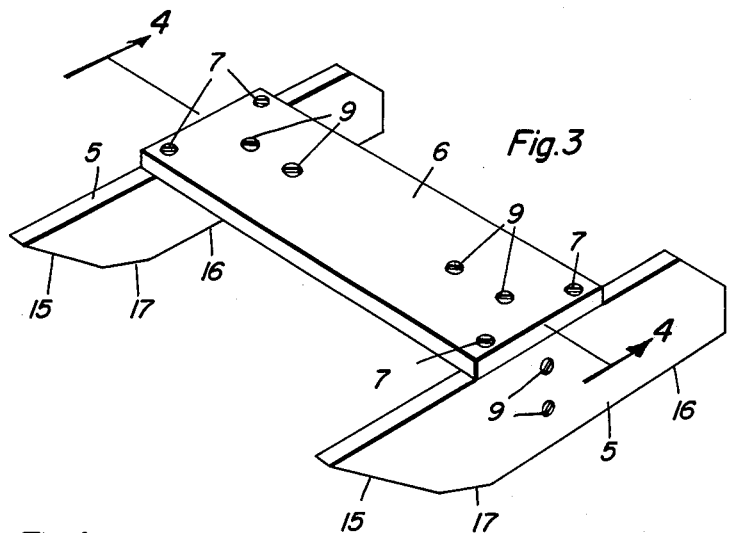
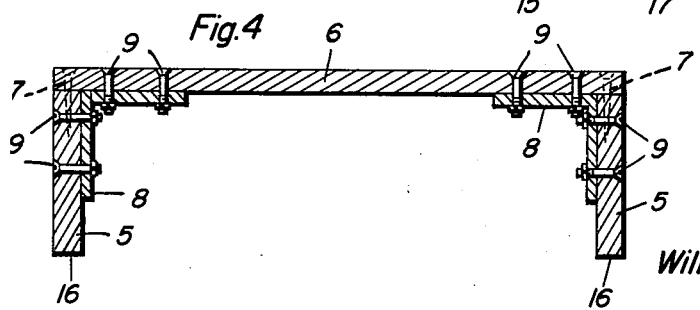
William J. Ziegler
INVENTOR.
BY *Clarence A. O'Brien
and Harvey B. Jacobson*
Attorneys

United States Patent Office 2,994,365
Patented Aug. 1, 1961

2,994,365
AUTOMOBILE FOOTREST
William J. Ziegler, 8421 Brooks St., Tampa, Fla.
Filed July 23, 1959, Ser. No. 829,084
2 Claims. (Cl. 297—439)

This invention relates to new and useful improvements in footrests to be used particularly in motor vehicles and has for its primary object to provide, in a manner as hereinafter set forth, novel means for promoting the comfort and safety of short passengers occupying the front or operator's seat of the vehicle, obviating the usual safety belt, back pillow, etc.

Another very important object of the present invention is to provide a motor vehicle footrest of the aforementioned character which is readily reversible to accommodate children and unusually short adults.

Still another important object of the invention is to provide a footrest of the character described which is usable in substantially all passenger cars.

Other objects of the invention are to provide a reversible automobile footrest of the character set forth which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in side elevation, showing a footrest embodying the present invention in use in an automobile;

FIGURE 2 is a view substantially similar to FIGURE 1 but showing the device reversed;

FIGURE 3 is a perspective view of the footrest; and

FIGURE 4 is a view in transverse section on an enlarged scale through the device, taken substantially on the line 4—4 of FIGURE 3.

Referring now to the drawing in detail, it will be seen that the embodiment of the invention which has been illustrated comprises a pair of spaced, parallel side members or bars 5 of wood or other suitable material. A transversely extending platform or foot bar 6, also of wood or other suitable material, has its end portions rigidly secured on the side members 5 by screws 7 and angle brackets 8. Countersunk bolts 9 secure the angle brackets 8 to the members 5 and 6. Of course, the members 5 and 6 may be of any suitable dimensions.

The device is adapted to rest on the usual floor 10 and toeboard 11 of an automobile 12 forwardly of the passenger's side of the front or operator's seat 13 of said automobile. Toward this end, the side members 5 have one end portion 15 cut at an angle relatively to the bottom edges 16 of said members which approximates that of the toeboard 11 to the floor 10. Between the bearing edges 15 and 16 thereof, the members 5 further include obtusely cut corner portions 17 for clearing the corner 18 defined by the floor 10 and the toeboard 11.

It is thought that the use of the device will be readily apparent from a consideration of the foregoing. Briefly, the device is usually positioned in the vehicle 12 as shown in FIGURE 1 of the drawing, the bottom edges 16 of the members 5 resting on the toeboard 11 with the ends 15 resting on the floor 10, the corner portions 17 of said members 5 bridging or clearing the corner 18. Thus, the leg space forwardly of the vehicle seat 13 is materially shortened and the feet, as indicated at 19, of a passenger occupying said seat are firmly and comfortably supported on the platform or foot bar 6. To accommodate children or unusually short adults, the device is reversed as shown in FIGURE 2 of the drawing. In the reversed position the longitudinal edges 16 of the members 5 rest on the floor 10 and the ends 15 of said members abut the toeboard 11. The construction and arrangement is such that when the device is thus reversed the leg room forwardly of the seat 13 is further materially reduced. When the footrest is not in use it may be conveniently stored in the rear of the vehicle. Of course, the device may be colored as desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in an automobile particularly for occupants of the front seat be they children or short-legged persons, a portable footrest comprising a pair of spaced parallel coplanar vertical side members, corresponding ends of said side members being mitered to provide oblique angle abutment surfaces capable of being brought into firm contact with the inclined toeboard on the one hand and the generally horizontal floor on the other hand, said side members having straight flat lower lengthwise edges and the junctional portion between the oblique angled abutments and adjacent ends of said edges being disposed so that they are at approximate obtuse angles to said lower edges, and a foot resting bar having end portions secured to intermediate portions of the upper edges of said side members, said bar being of limited cross-section and disposed at right angles to said side members, said side members being of a length several times the cross-sectional dimension of said bar and the respective forward and rearward end portions of the side members extending well beyond the forward and rearward lengthwise edges of said bar.

2. For use in an automobile particularly for occupants of the front seat be they children or short-legged persons, a portable footrest comprising a pair of spaced parallel coplanar vertical side members, corresponding ends of said side members being mitered to provide oblique angle abutment surfaces capable of being brought into firm contact with the inclined toeboard on the one hand and the generally horizontal floor on the other hand, said side members having straight flat lower lengthwise edges and the junctional portion between the oblique angled abutments and adjacent ends of said edges being disposed so that they are at approximate obtuse angles to said lower edges, and a foot resting bar having end portions secured to intermediate portions of the upper edges of said side members, said end portions resting atop an intermediate upper edge portion of the side members and being secured thereto, the lengthwise edges of said bar being spaced from the respective ends of the side members and said side members being of prerequisite height to dispose the bar in an elevational plane so that when the device is in use ample heel clearance is provided between the bar and the underlying surface whether it be the floor or the toeboard.

References Cited in the file of this patent
UNITED STATES PATENTS 2,593,623    Stempel _____ Apr. 22, 1952
2,654,420    Rogers _____ Oct. 6, 1953